C. D. HIBBS.
FABRIC STRIPPING MACHINE.
APPLICATION FILED JULY 1, 1919.
1,321,790. Patented Nov. 11, 1919.
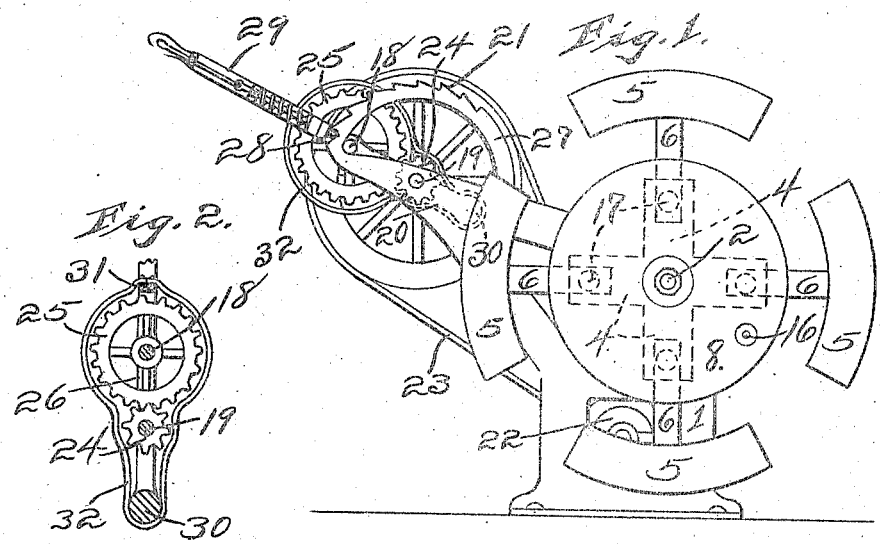
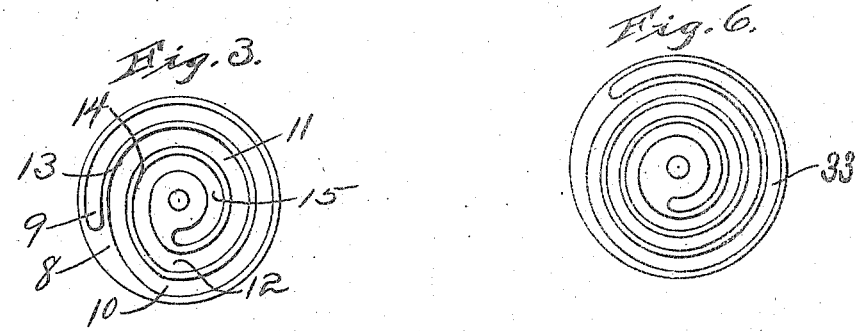
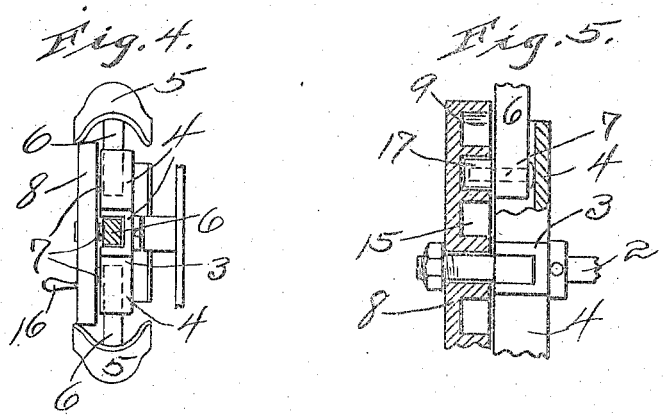

UNITED STATES PATENT OFFICE.

CASSELL D. HIBBS, OF FORT WORTH, TEXAS.

FABRIC-STRIPPING MACHINE.

1,321,790.　　　　　Specification of Letters Patent.　　Patented Nov. 11, 1919.

Application filed July 1, 1919. Serial No. 308,010.

*To all whom it may concern:*

Be it known that I, CASSELL D. HIBBS, a citizen of the United States of America, residing at Forth Worth, in the county of Tarrant and State of Texas, have invented certain new and useful Improvements in Fabric-Stripping Machines, of which the following is a specification.

My invention relates to improvements in fabric stripping machines, and the object is to provide machines for stripping the fabric from discarded pneumatic tire casings, and to provide certain improvements in such machines which will make the main stripping easily and quickly adjustable to different sizes of casings and which will improve the operation of such machines. Other objects and advantages will be fully explained in the following description and the invention will be more particularly pointed out in the claims.

Reference is had to the accompanying drawings which form a part of this application.

Figure 1 is a side elevation of the machine. Fig. 2 is a detail view of the driving gear and a counterweight. Fig. 3 is a face view of the adjusting wheel. Fig. 4 is a detail view of the stripping and adjusting wheels, showing one section of the stripping wheel removed and a section of an adjusting arm. Fig. 5 is a broken sectional view of the same. Fig. 6 is a face view of an adjusting wheel which differs from the wheel shown in the previous views.

Similar characters or reference are used to indicate the same parts throughout the several views.

This machine is provided with an upright frame 1 and a shaft 2 journaled therein. The stripping wheel comprises a hub 3 having radiating hollow or grooved spokes 4 integral with said hub. The rim of the stripping wheel is made in sections 5 and provision is made for moving these sections radially inward and outward so that the wheel may be adjusted for casings of different diameters. The sections 5 have telescoping spoke members 6 which move in the arms or spoke members 4. The members 6 carry stub shafts or spindles 7. A disk 8 is mounted on shaft 2 and is provided with an irregularly curved groove or curved cam groove therein on the side facing the stripping wheel. Commencing at the point 9, the groove is regular to the point 10. The groove is then diverted inwardly a whole step to the groove 11 which is irregular from the point 10 to the point 13 and regular from the point 13 to the point 12. The groove is then diverted to groove 15 which is irregular from the point 12 to the point 14 and then regular from the point 14 to the end. The disk 8 is loosely mounted on the shaft 2 and may be turned by a handle or crank 16. The spindles or stub shafts 7 project into the irregular groove in the disk 8 and each spindle or stub shaft 7 is provided with a ball bearing 17 so that the shafts or spindles or eccentric pins 7 will move freely therein without binding or much friction. When the disk 8 is turned the sections 5 will be drawn inwardly or outwardly according to the direction of the turning of the disk and one section 5 will be moved at a time until all are adjusted to the required radius. The stripping wheel can thus be contracted for mounting a tire casing thereon and then expanded for tightening the casing thereon.

The fabric is stripped on a shaft 18. A driving shaft 19 is journaled in the extended frame members 20 and a pulley 21 is made rigid therewith and is driven from the motor 22 by the belt 23. A pinion 24 is also rigid with the shaft 19 and this pinion meshes with and drives a gear wheel 25 which is rigid with shaft 18. The shaft 18 is journaled in a swinging frame 26 which is pivotally mounted on the axle or shaft 19. The shaft 18 can be brought closer to or moved farther away from the stripping wheel by swinging the same on the shaft 19 and held in different positions by a rack 27 which may be formed integral with the frame members 20, and by a spring actuated dog 28 which is carried by the lever 29. The frame 26 is extended for the purpose of carrying a counterweight 30. A sheet metal shield or hood 32 for the protecting of the gear wheels 24 and 25 is attached to the part 31 of the frame 26 and extended under the counterweight 30. The counterweight 30 aids in adjusting the stripping shaft and in holding the same in place. The drawings show the shaft 18 at the farthest point from the stripping wheel and the frame 20 and the rack 21 form a stop for the outward swinging of the shaft 18.

In the form of wheel shown in Fig. 6, the controlling lugs 7 with their rollers 17 run in the groove 33 and move all the sections 5 simultaneously. The groove 33 is convolute in form so that none of the sections 5 would be of the same distance radially from the center of the wheel as another section, unless the arms 6 are of gradually increased length.

In operation a portion of the fabric is loosened and caught on the shaft 18. The machine is then driven to turn the shaft 18 so that the fabric will be wound on the shaft 18. The sections 5 may be drawn inwardly for mounting a tire casing and then forced outwardly by the disk 8 for tightening the casing on the sections 5.

What I claim, is,—

1. A fabric stripping machine comprising a shaft and a reel having a segmental periphery, radially movable arms carrying said periphery, means for moving said arms radially consisting of a disk having an irregular groove in one face and mounted on said shaft and lugs rigid with said arms and projecting in said groove and means for turning said disk, and a stripping shaft and means for driving the same.

2. A fabric stripping machine comprising a shaft and a reel thereon, means for expanding the periphery of said reel, a stripping shaft, a swinging frame for said shaft, means for driving said shaft, means for positioning said stripping shaft nearer to or farther from said reel, and a counterbalance weight carried by said swinging frame for aiding in adjusting said stripping shaft.

In testimony whereof I set my hand, this 27th day of June, A. D., 1919.

CASSELL D. HIBBS.